(12) United States Patent
Ramos et al.

(10) Patent No.: US 11,972,004 B2
(45) Date of Patent: Apr. 30, 2024

(54) DOCUMENT REDACTION AND RECONCILIATION

(71) Applicant: International Business Machines Corporation, Armonk, NY (US)

(72) Inventors: Igor S. Ramos, Round Rock, TX (US); Marc Dickenson, Austin, TX (US); Sumabala Nair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/438,439

(22) Filed: Jun. 11, 2019

(65) Prior Publication Data

US 2020/0394322 A1 Dec. 17, 2020

(51) Int. Cl.
- *G06F 16/23* (2019.01)
- *G06F 16/176* (2019.01)
- *G06F 16/93* (2019.01)
- *G06F 21/62* (2013.01)

(52) U.S. Cl.
CPC ...... *G06F 21/6218* (2013.01); *G06F 16/1767* (2019.01); *G06F 16/2358* (2019.01); *G06F 16/2379* (2019.01); *G06F 16/93* (2019.01)

(58) Field of Classification Search
CPC ............... G06F 16/176; G06F 16/1767; G06F 16/2358; G06F 16/2379; G06F 16/93; G06F 21/6218; G06F 21/64
See application file for complete search history.

(56) References Cited

U.S. PATENT DOCUMENTS

| | | | |
|---|---|---|---|
| 5,787,175 A | 7/1998 | Carter | |
| 10,163,080 B2 | 12/2018 | Chow et al. | |
| 10,410,016 B1 * | 9/2019 | Damick | H04L 63/0435 |
| 10,762,060 B1 * | 9/2020 | Faulkner | G06F 7/14 |
| 2003/0081790 A1 * | 5/2003 | Kallahalla | H04L 9/088 |
| | | | 380/281 |
| 2007/0136662 A1 | 6/2007 | Khaba | |
| 2013/0297559 A1 * | 11/2013 | Bailor | G06F 21/6227 |
| | | | 707/608 |

(Continued)

FOREIGN PATENT DOCUMENTS

| | | | | |
|---|---|---|---|---|
| KR | 20200097147 A | * | 8/2020 | |
| WO | WO-2017153495 A1 | * | 9/2017 | G06Q 10/1053 |
| WO | WO-2018100227 A1 | * | 6/2018 | G06F 16/00 |

OTHER PUBLICATIONS

List of IBM Patents or Patent Applications Treated as Related, Jun. 16, 2019.

(Continued)

*Primary Examiner* — James E Richardson

(57) ABSTRACT

An example operation may include one or more of splitting, by a document server, a document provided by a document owner node into a plurality of segments to be stored on a ledger of a blockchain, detecting, by the document server, a change to the document made by an authorized participant node, updating, by the document server, a segment of the plurality of segments stored on the ledger based on the change to the document, collecting, by the document server, votes on the change to the document from a plurality of participant nodes, and committing the updated segment to the blockchain based on the votes.

17 Claims, 19 Drawing Sheets

(56) References Cited

U.S. PATENT DOCUMENTS

| | | | |
|---|---|---|---|
| 2015/0074033 A1* | 3/2015 | Shah | G06N 5/02 |
| | | | 706/46 |
| 2017/0103472 A1 | 4/2017 | Shah | |
| 2017/0220815 A1* | 8/2017 | Ansari | G06Q 20/389 |
| 2017/0237569 A1 | 8/2017 | Vandervort | |
| 2017/0243193 A1* | 8/2017 | Manian | G06Q 20/3829 |
| 2017/0287090 A1 | 10/2017 | Hunn et al. | |
| 2017/0289111 A1 | 10/2017 | Voell et al. | |
| 2017/0364701 A1 | 12/2017 | Struttmann | |
| 2018/0052813 A1* | 2/2018 | Laupretre | H04L 65/403 |
| 2018/0173719 A1 | 6/2018 | Bastide et al. | |
| 2018/0183810 A1 | 6/2018 | Jones et al. | |
| 2018/0189732 A1 | 7/2018 | Kozloski et al. | |
| 2018/0219683 A1* | 8/2018 | Deery | H04L 63/083 |
| 2019/0236562 A1* | 8/2019 | Padmanabhan | H04L 63/00 |
| 2019/0281066 A1* | 9/2019 | Simons | H04L 9/3239 |
| 2019/0305938 A1* | 10/2019 | Sandberg-Maitland | |
| | | | H04L 9/321 |
| 2019/0311147 A1 | 10/2019 | Gollogly | |
| 2019/0325038 A1* | 10/2019 | Finlow-Bates | G06F 16/162 |
| 2019/0334912 A1 | 10/2019 | Sloane et al. | |
| 2019/0342074 A1* | 11/2019 | Housholder | H04L 9/0637 |
| 2020/0204358 A1* | 6/2020 | Nandakumar | H04L 9/3236 |

OTHER PUBLICATIONS

I. Ramos et al., Document Redaction and Reconciliation, U.S. Appl. No. 16/438,427, filed Jun. 11, 2019 (a copy is not provided as this application is available to the Examiner).

COVEPDF, "Straight line to the future of document management: A new way of document collaboration, powered by Blockchain" http://blockchain.covepdf.com/dl/Introductio_to_CovePDF_Blockchain.pdf [Accessed Jan. 13, 2019].

Graphite, "Graphite" [Accessed Jan. 13, 2019] https://www.graphitedocs.com/.

* cited by examiner

510

DOCUMENT REDACTION AND RECONCILIATION

TECHNICAL FIELD

This application generally relates to a database storage system, and more particularly, to redaction and reconciliation.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and failures occur (for example, a hardware, a firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

As such, what is needed is a blockchain-based solution that overcomes these drawbacks and limitations. Blockchains may be used for secure document sharing. Sometimes just portions of a document need to be shared securely for edits or review, while other parts of that document must remain classified because they contain sensitive information. Furthermore, sometimes portions of a shared document may need to be redacted. For example, there are regulations such as HIPPA, GDPR, PCI, where certain information such as social security numbers, credit card numbers and other personally identifiable data may need to be redacted for compliance with standards. This complicates daily business transactions, because it restricts the exchange of documents. For example, the electronic document may contain PHI (personal health info) and may need to be send to a contracting vendor to extract billing codes (or other processing). The organization may not want to reveal the PHI to the contractor. Thus, a redacted version of the documents may be shared to fix/annotate billing codes without having PHI revealed.

While existing solutions may create a version of the original document for sharing, the changes to the derived document may not be easily reconciled into the original document. Existing solutions often apply encryption of the file content as an after-thought or an additional security step(s), which leaves the files vulnerable to human error. The encryption is built-in as part of a blockchain design. Also, in a blockchain network, only encrypted content is stored.

Accordingly, it is desired to have a blockchain-based solution for redaction and reconciliation of documents.

SUMMARY

One example embodiment provides a system that includes a processor and memory, wherein the processor is configured to perform one or more of receive a document from a document owner node, the document contains restricted access segments, split the document into a plurality of ledger entries to be stored on a blockchain, update a ledger entry of the plurality of the ledger entries based on a proposed change to the document made by an authorized participant node, commit the ledger entry to the blockchain based on votes collected from a plurality of participant nodes, and send a notification to a set of participating nodes of the plurality of the participant nodes authorized to view the document.

Another example embodiment provides a system that includes a processor and memory, wherein the processor is configured to perform one or more of split a document provided by a document owner node into a plurality of segments to be stored on a ledger of a blockchain, detect a change to the document made by an authorized participant node, update a segment of the plurality of segments stored on the ledger based on the change to the document, collect votes on the change to the document from a plurality of participant nodes, and commit the updated segment to the blockchain based on the votes.

Another example embodiment provides a method that includes one or more of receiving, by a document server, a document from a document owner node, the document contains restricted access segments, splitting, by the document server, the document into a plurality of ledger entries to be stored on a blockchain, updating, by the document server, a ledger entry of the plurality of the ledger entries based on a proposed change to the document made by an authorized participant node, committing, by the document server, the ledger entry to the blockchain based on votes collected from a plurality of participant nodes, and sending a notification to a set of participating nodes of the plurality of the participant nodes authorized to view the document.

Another example embodiment provides a method that includes one or more of splitting, by a document server, a document provided by a document owner node into a plurality of segments to be stored on a ledger of a blockchain, detecting, by the document server, a change to the document made by an authorized participant node, updating, by the document server, a segment of the plurality of segments stored on the ledger based on the change to the document, collecting, by the document server, votes on the change to the document from a plurality of participant nodes, and committing the updated segment to the blockchain based on the votes.

A further example embodiment provides a non-transitory computer readable medium comprising instructions, that when read by a processor, cause the processor to perform one or more of receiving a document from a document owner node, the document contains restricted access segments, splitting the document into a plurality of ledger entries to be stored on a blockchain, updating a ledger entry of the plurality of the ledger entries based on a proposed change to the document made by an authorized participant node, committing the ledger entry to the blockchain based on votes collected from a plurality of participant nodes, and sending a notification to a set of participating nodes of the plurality of the participant nodes authorized to view the document.

A further example embodiment provides a non-transitory computer readable medium comprising instructions, that when read by a processor, cause the processor to perform one or more of splitting a document provided by a document owner node into a plurality of segments to be stored on a ledger of a blockchain, detecting a change to the document made by an authorized participant node, updating a segment of the plurality of segments stored on the ledger based on the change to the document, collecting votes on the change to the document from a plurality of participant nodes, and committing the updated segment to the blockchain based on the votes.

DETAILED DESCRIPTION

Figure 1A:
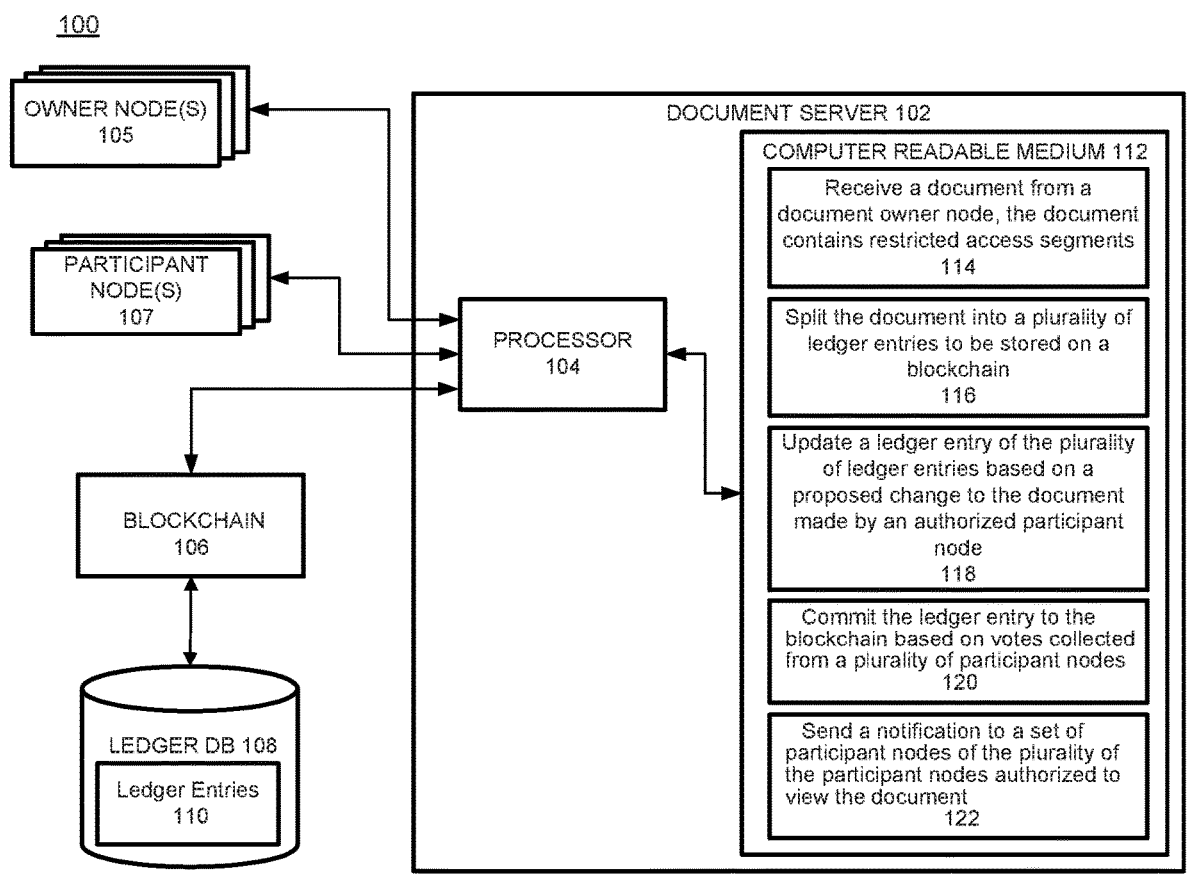
FIG. 1A illustrates a network diagram of a system including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which provide for redaction and reconciliation of a document.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains often involve native crypto-currency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include a method and system for redaction and reconciliation of a document in blockchain networks. The exemplary embodiments solve the issues of time and trust by extending features of a database such as immutability, digital signatures and being a single source of truth. The exemplary embodiments provide a solution for redaction and reconciliation of a document in blockchain-based network. The blockchain networks may be homogenous based on the asset type and rules that govern the assets based on the smart contracts.

Blockchain is different from a traditional database in that blockchain is not a central storage, but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system for redaction and reconciliation of a document in blockchain networks is implemented due to immutable accountability, security, privacy, permitted decentralization, availability of smart contracts, endorsements and accessibility that are inherent and unique to blockchain. In particular, the blockchain ledger data is immutable and that provides for efficient method for redaction and reconciliation of a document in blockchain networks. Also, use of the encryption in the blockchain provides security and builds trust. The smart contract manages the state of the asset to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set and write-set. In other words, the blockchain inherent features provide for efficient implementation of a method for redaction and reconciliation of a document.

One of the benefits of the example embodiments is that it improves the functionality of a computing system by implementing a method for redaction and reconciliation of a document in blockchain-based systems. Through the blockchain system described herein, a computing system can perform functionality for redaction and reconciliation of a document in blockchain networks by providing access to capabilities such as distributed ledger, peers, encryption technologies, MSP, event handling, etc. Also, the blockchain enables to create a business network and make any users or organizations to on-board for participation. As such, the blockchain is not just a database. The blockchain comes with capabilities to create a Business Network of users and on-board/off-board organizations to collaborate and execute service processes in the form of smart contracts.

The example embodiments provide numerous benefits over a traditional database. For example, through the blockchain the embodiments provide for immutable accountability, security, privacy, permitted decentralization, availability of smart contracts, endorsements and accessibility that are inherent and unique to the blockchain.

Meanwhile, a traditional database could not be used to implement the example embodiments because it does not bring all parties on the business network, it does not create trusted collaboration and does not provide for an efficient storage of digital assets. The traditional database does not provide for a tamper proof storage and does not provide for preservation of the digital assets being stored. Thus, the proposed method for redaction and reconciliation of a document in blockchain networks cannot be implemented in the traditional database.

Meanwhile, if a traditional database were to be used to implement the example embodiments, the example embodiments would have suffered from unnecessary drawbacks such as search capability, lack of security and slow speed of transactions. Additionally, the automated method for redaction and reconciliation of a document in the blockchain network would simply not be possible.

Accordingly, the example embodiments provide for a specific solution to a problem in the arts/field of asset access management in the blockchain networks.

The example embodiments also change how data may be stored within a block structure of the blockchain. For example, a digital asset data may be securely stored within a certain portion of the data block (i.e., within header, data segment, or metadata). By storing the digital asset data within data blocks of a blockchain, the digital asset data may be appended to an immutable blockchain ledger through a hash-linked chain of blocks. In some embodiments, the data block may be different than a traditional data block by having a personal data associated with the digital asset not stored together with the assets within a traditional block structure of a blockchain. By removing the personal data associated with the digital asset, the blockchain can provide the benefit of anonymity based on immutable accountability and security.

According to the exemplary embodiments, a system and method for handling of electronic documents containing protected information are provided. The exemplary embodiments permit for a secure redaction, distribution, and reconciliation of documents involving complex cases where multiple parties are involved. In some cases each party may have a different privilege level applied to certain document segments. The exemplary embodiments may create a fast and secure reconciliation flow. A system (i.e., a document server), in accordance to the exemplary embodiment, may accept edits from authorized users, then it may dispatch the proposed changes to an approval flow (if set by the owner). The document server may tally the votes for consensus, and then it may reconcile the differences back into the original document. Finally, the document server provides a real-time update notification to all users including viewers of a redacted document version. In simple terms, everyone works off the master document, even the redacted viewers.

In a sensitive document, which needs restricted access control levels (ACL), the owner may define who has access to which portions of the document and specifies view (read) or edit (write) access for each portion/segment (word, sentence, paragraph, spreadsheet cell, column, row, etc.) of the document. The document owner may also define the consensus method for reconciling document edits. The owner may, for example, select consensus as "all voters must agree" or "most voters must agree." Finally, the owner may assign voters that can accept or reject the proposed edits. After this initial set up, the owner may publish his changes to a document server (e.g., a cloud server). The document server then parses the document, splitting it into multiple ledger entries for blockchain storage. From that point, the blockchain enforces the access to each document portion, such that only authorized users can obtain view or edit access to the document or may vote on each segment, as defined by the owner via an application (e.g., a word processing application or similar). When an authorized editor performs a change to the document, the ledger entry for that segment is updated with the proposed change. The voters must then approve or reject the change. Once the voting is concluded, the votes are tallied up, and upon consensus the update is marked as proposed. The update must be voted per rules set by a block, before the editor's changes become effective.

In one exemplary embodiment, upon voting completion, results are tallied and if there is a change to the original document, all viewer nodes get a real-time notification of the document updates. For example, the updates may be provided via a word processing application or another special application. If there is no consensus on the proposed changes, a new ledger entry is generated to reflect rejection of the editor's proposed changes.

According to one exemplary embodiment, security is strictly enforced using smart contracts running on a blockchain fabric. In other words, the security is not something that has to be "added in" as an option to an existing document, because the security is built into the entire blockchain process. The document server tokenizes a document into segments and stores the segments into blockchain ledger entries that provide fine-grained access control levels. The document server creates a single source of truth, regardless of a user's access control level, hence eliminating multiple copies of the same document. An unauthorized user does not have to see the entire document to make a change to a certain portion. Configuration of the consensus rules may be implemented at a segment level. Consensus is enforced by the smart contracts on the blockchain fabric. The document server connected to the blockchain provides for an end to end solution—i.e., redaction, distribution, and reconciliation of document may occur seamlessly and entirely within an encrypted space as defined by the smart contracts on the blockchain fabric. According to one exemplary embodiment, CRUD (Create, Read, Update, and Delete) operations may be enabled for a document entirely within an encrypted space so that there is never a moment that an unencrypted version of the document is stored on the client's disk. The document server may provide real-time update notifications to all users including viewers of a redacted document version.

According to the exemplary embodiments, a user may create a new document in the word processing application. This user becomes the document owner. That initial document may be referred to as the seed document and is the source of truth. The owner is given full rights to compose and restrict the seed document's access. The word processing application (or other application that may produce the seed document) may connect to the document server (e.g., a cloud server) using CRUD-based calls. The document server may manage the document lifecycle, such as rendering, editing, and voting for changes. The document owner may decide to securely allow others to view or edit portions (i.e., segments) of the document. The owner may then select a portion(s) of the document and may assign access level to the portion(s) along with the authorized users. For example, the document owner may highlight and restrict access to a text segment "dolor sit amet" to a user Mary. The result may be intended as a segment to be redacted out for a user John.

Then, the owner may highlight the word "labore" to give edit access to an authorized user Mary. The document owner may at this time (optionally) define and select the consensus method and may assign which participants are to vote to approve Mary's changes. Additionally, view, edit, or vote permissions may have an expiration date. The document owner may publish his changes (i.e., may either create a new document or may alter an existing one) to the document server. The document server may split the document into separate transactions in a manner that is compatible with the selected blockchain technology in the implementation (Hyperledger, Ethereum, etc.). Then, the document server may submit transaction(s) to update the blockchain ledger.

In one embodiment, parsing and splitting of the seed document may be implemented using a parent-child data model, which defines master and child components. The following three ledger entry classes may be used:
(1) MASTER DOCUMENT RECORD (MDR);
(2) CHILD RECORD; and
(3) ACCESS CONTROL LIST (ACL).

Concept of PARTICIPANT, ASSET, and TRANSACTIONS may be used. The MDR contains references to CHILD RECORDS and the ACCESS CONTROL LIST (ACL). These artifacts are based on the specifications generated by the document server. Each child record represents a segment that is redacted for different participants. The ACL document contains the permissions for each child document specified. For example, a transaction may indicate that only Oscar and Mary can write to the child record with document id "z". The MDR may also contain information on how the child elements should be assembled, so that the word processing application (or similar client application) can render the final document view. This allows users recreate a version of the seed document containing the user-specific viewing, editing and voting privileges. For example, the MDR may show the following child element: [['x', 0], ['y', 0], ['x', ['z', 0], ['x', 2]], where the first value pair (['x', 0]), is decoded as follows: 'x' is the child document id, the second value "0" is the child's value index. The value pair (['x', 0]) indicates which segment of the child document is to be rendered. Note that a child record may have multiple segments stored in it. The MDR may contain document rendering logic. For example, the MDR child may show that rendering takes place by first taking a pair ['x', 0], where child document is 'x', an value index is 0. The document server may evaluate the ACL (sent in a transaction) and then fetch document X (sent in another transaction). The document may be retrieved either by fetching the corresponding block directly or by reading a world state database. For example, the document 'x', index 0 has the value of "Lorem ipsum". Thus, this segment needs to be rendered first. The next element to be rendered is ['y', 0], and the above process may be repeated until all child elements listed in the MDR are evaluated.

In one example, a child record 'z' may require approvals for a proposed change from either the document owner or from both Paul and Peter. Once approved, the change(s) may be reflected to the subscribing users. In one embodiment, each ledger entry may include creation and update timestamps and version number(s). The child record may include other metadata such as PCI-type of data. The child record may make reference to another child record and or an object located at another source (e.g., off the blockchain storage). This may be used for embedding of large data such as video files. A client application (e.g., word processing application) may subscribe to the document server (e.g., a cloud server) to receive real-time updates on changes to the document of interest. In one embodiment, read-only users may not receive notifications on the proposed changes, but may only receive the notification on the committed/voted changes. The subscription mechanism may be implemented using WebSockets and a queue (RabbitMQ, Kafka) or other equivalent technology. This may allow for a simultaneous document editing and for an instant notification of two users making conflicting changes to a text segment. In another embodiment, a document may be, for example, an MS EXCEL spreadsheet, MS Visio, or MS EXCEL document, vector graphics, or layer-based computer-aided design (CAD) document. This may allow, for example, a blueprint of a building (or of a city) to be shared with contractors on an as-needed basis without revealing sensitive information about the entire infrastructure. In another embodiment, Hyperledger Composer solutions may be used.

In one exemplary embodiment, a client application may accept an ID card as an input. The client application may consume REST APIs exposed for the contract and may aggregate the document accordingly for each participant based on the role and access control defined for the participant. Additional security can be enforced by mechanisms like enforcing an ID login into nthe application before allowing the ID card to be imported and associating the ID card and the login credentials. Storing and managing of assets on the blockchain can be accomplished in several ways. If the size of the asset/asset segments is not a concern, the asset can be converted into blob(s) and stored directly in the blockchain if the participants in the network are willing and the cost is acceptable. One important thing to note is that the transactions are replicated in a blockchain solution, so if storage is a concern other off-chain solutions may be used. Other reasons for the off-chain storage may be the owner not wanting the document/segments distributed across the network, but rather stored in a secure trusted location (or legal/government requirements that require a specific kind of centralized storage). In cases of the off-chain storage, instead storing of the actual document segments/child documents, hashes referencing the asset (i.e., a document) may be stored on the blockchain.

Figure 1B:
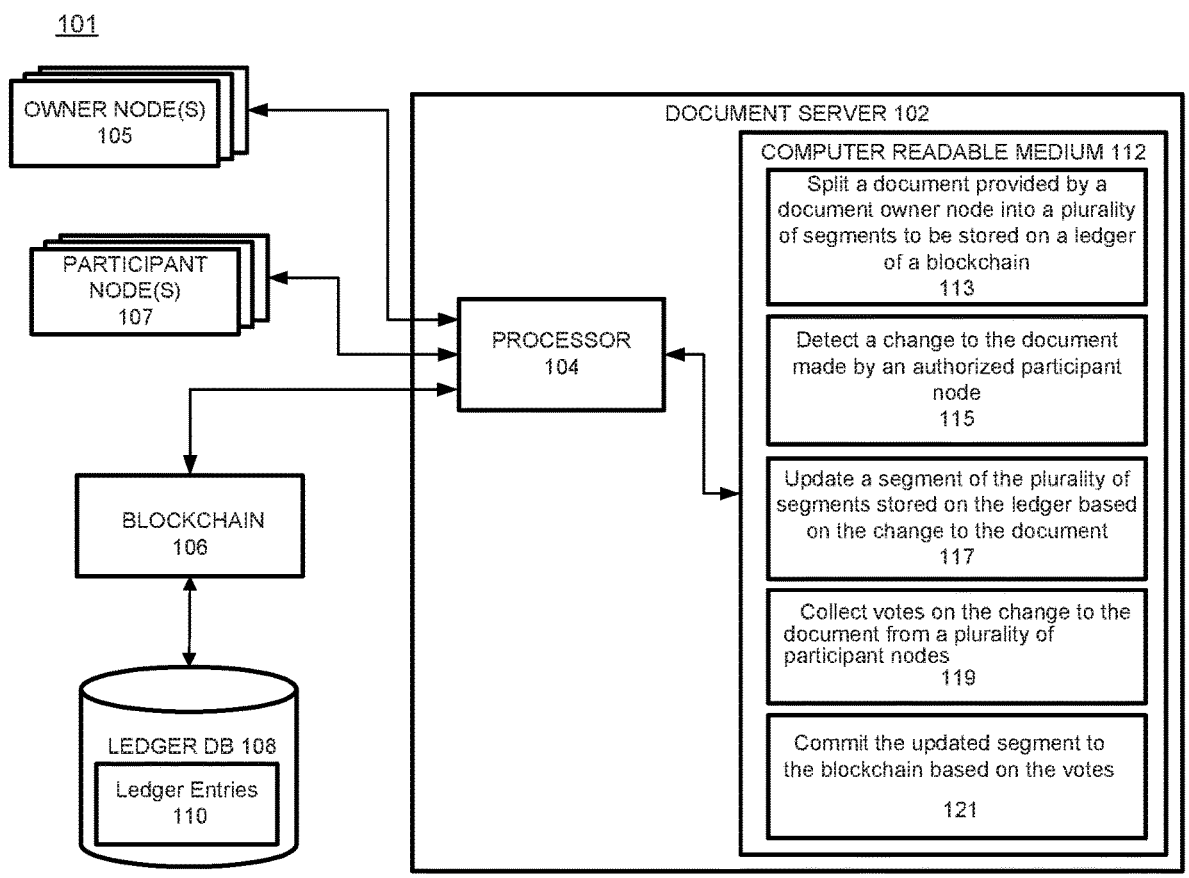
FIG. 1B illustrates a network diagram of a system including a database, according to example embodiments.

FIG. 1B illustrates a logic network diagram for redaction and reconciliation of a document in a blockchain network, according to example embodiments.

Referring to FIG. 1B, the example network 100 includes a document server 102 connected to document owner nodes 105 and to other participant nodes 107. The document server 102 may be connected to a blockchain 106 that has a ledger 108 for storing ledger entries 110. While this example describes in detail only one document server 102, multiple such nodes may be connected to the blockchain 106. It should be understood that the document server 102 may include additional components and that some of the components described herein may be removed and/or modified without departing from a scope of the document server 102 disclosed herein. The document server 102 may be a computing device or a server computer, or the like, and may include a processor 104, which may be a semiconductor-based microprocessor, a central processing unit (CPU), an application specific integrated circuit (ASIC), a field-programmable programmable gate array (FPGA), and/or another hardware device. Although a single processor 104 is depicted, it should be understood that the document server 102 may include multiple processors, multiple cores, or the like, without departing from the scope of the document server node 102 system.

The document server 102 may also include a non-transitory computer readable medium 112 that may have stored thereon machine-readable instructions executable by the processor 104. Examples of the machine-readable instructions are shown as 114-122 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 114 to receive a document from a document owner node 105. The document may contain restricted access segments. As discussed above, the blockchain ledger 108 may store the segments of a seed document in a form of ledger entries 110. The blockchain 106 network may be configured to use one or more smart contracts that manage transactions for multiple participating nodes. The document server 102 may provide real-time notifications to the nodes 105 and 107.

The processor 104 may fetch, decode, and execute the machine-readable instructions 116 to split the document into a plurality of ledger entries 110 to be stored on a blockchain 106. The processor 104 may fetch, decode, and execute the machine-readable instructions 118 to update a ledger entry of the plurality of ledger entries based on a proposed change to the document made by an authorized participant node. The processor 104 may fetch, decode, and execute the machine-readable instructions 120 to commit the ledger entry to the blockchain based on votes collected from a plurality of participant nodes 107. The processor 104 may fetch, decode, and execute the machine-readable instructions 122 to send a notification to a set of participant nodes of the plurality of the participant nodes 107 authorized to view the document.

FIG. 1B illustrates a logic network diagram for redaction and reconciliation of a document in a blockchain network, according to example embodiments.

Referring to FIG. 1B, the example network 101 includes a document server 102 connected to document owner nodes 105 and to other participant nodes 107. The document server 102 may be connected to a blockchain 106 that has a ledger 101 for storing ledger entries 110. While this example describes in detail only one document server 102, multiple such nodes may be connected to the blockchain 106. It should be understood that the document server 102 may include additional components and that some of the components described herein may be removed and/or modified without departing from a scope of the document server 102 disclosed herein. The document server 102 may be a computing device or a server computer, or the like, and may include a processor 104, which may be a semiconductor-based microprocessor, a central processing unit (CPU), an application specific integrated circuit (ASIC), a field-programmable gate array (FPGA), and/or another hardware device. Although a single processor 104 is depicted, it should be understood that the document server 102 may include multiple processors, multiple cores, or the like, without departing from the scope of the document server node 102 system.

The document server 102 may also include a non-transitory computer readable medium 112 that may have stored thereon machine-readable instructions executable by the processor 104. Examples of the machine-readable instructions are shown as 113-121 and are further discussed below. Examples of the non-transitory computer readable medium 112 may include an electronic, magnetic, optical, or other physical storage device that contains or stores executable instructions. For example, the non-transitory computer readable medium 112 may be a Random Access memory (RAM), an Electrically Erasable Programmable Read-Only Memory (EEPROM), a hard disk, an optical disc, or other type of storage device.

The processor 104 may fetch, decode, and execute the machine-readable instructions 113 to split a document provided by a document owner node 105 into a plurality of segments to be stored on a ledger of a blockchain 106. As discussed above, the blockchain ledger 101 may store the segments of a seed document in a form of ledger entries 110. The blockchain 106 network may be configured to use one or more smart contracts that manage transactions for multiple participating nodes. The document server 102 may provide real-time notifications to the nodes 105 and 107.

The processor 104 may fetch, decode, and execute the machine-readable instructions 115 to detect a change to the document made by an authorized participant node 107. The processor 104 may fetch, decode, and execute the machine-readable instructions 117 to update a segment of the plurality of segments stored on the ledger 101 based on the change to the document. The processor 104 may fetch, decode, and execute the machine-readable instructions 119 collect votes on the change to the document from a plurality of participant nodes 107. The processor 104 may fetch, decode, and execute the machine-readable instructions 121 to commit the updated segment to the blockchain 106 based on the votes.

Figure 2A:
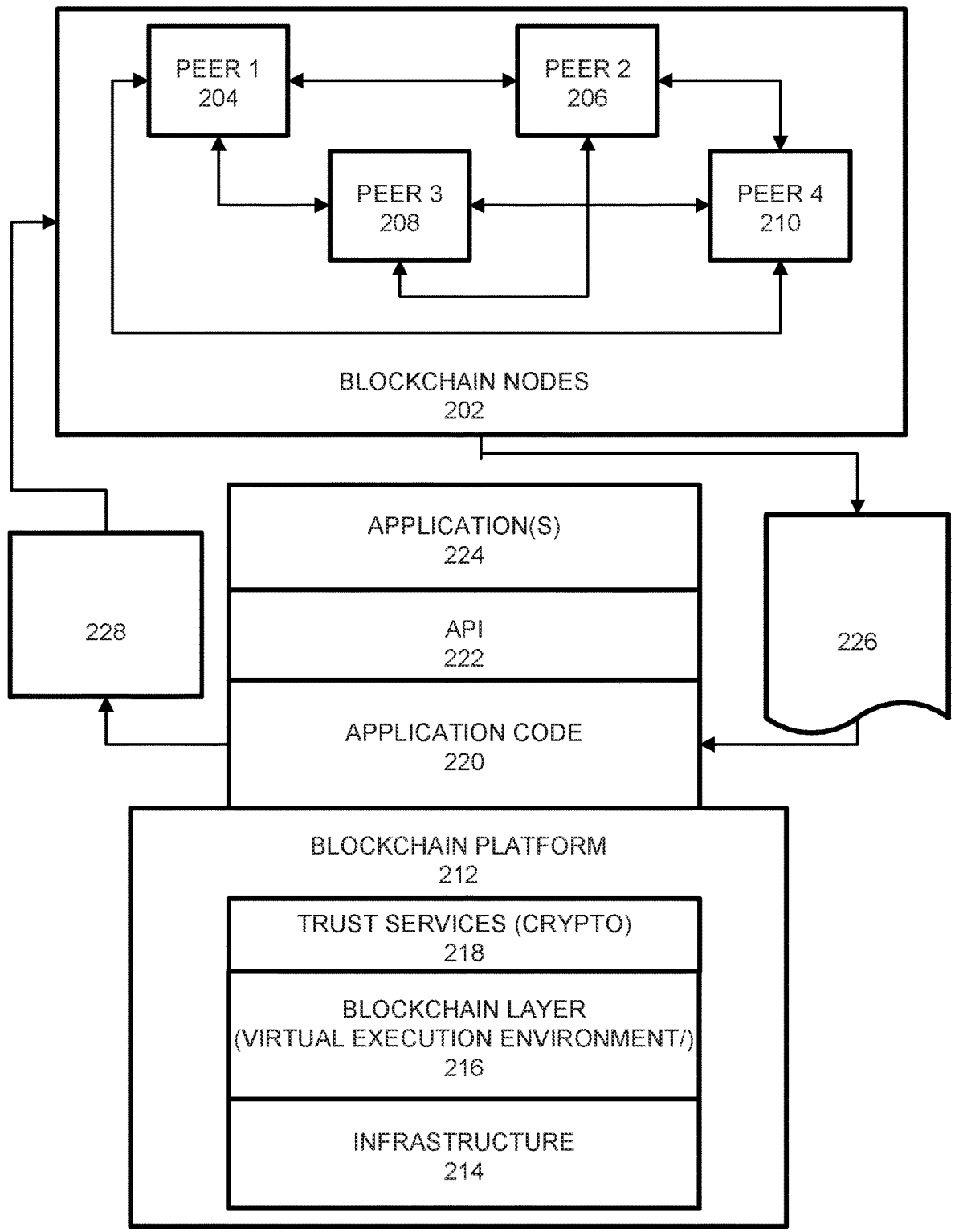
FIG. 2A illustrates an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the seed document information 226 may be processed by one or more processing entities (e.g., virtual machines) included in the blockchain layer 216. The result 228 may include data blocks reflecting changes to the seed document. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
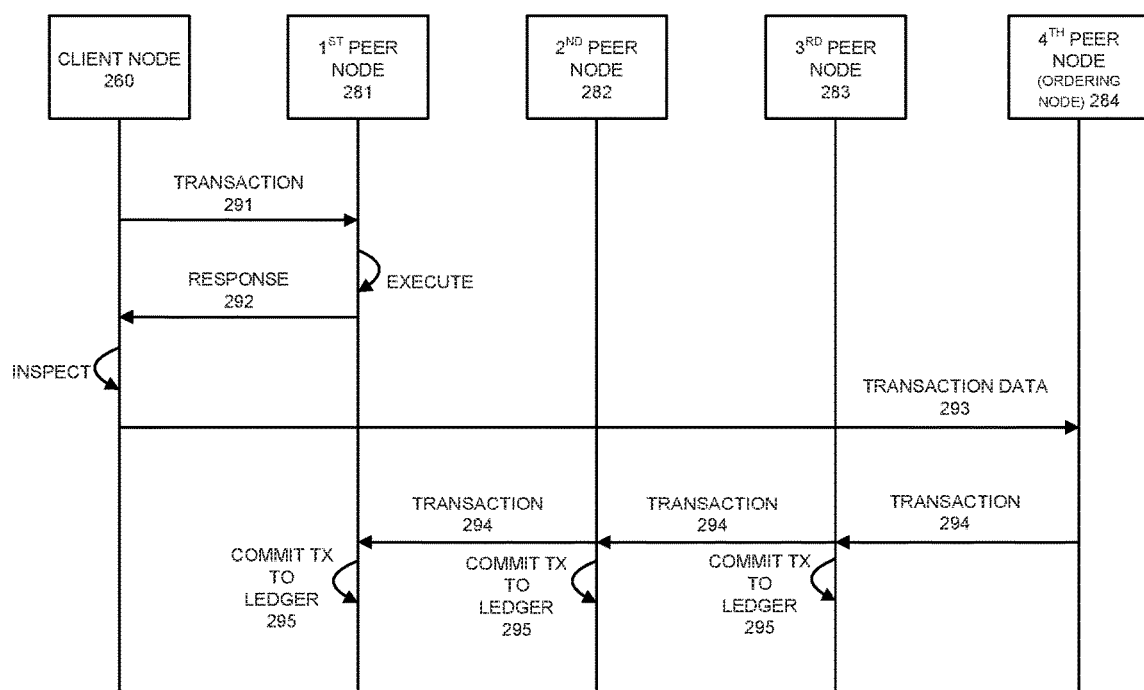
FIG. 2B illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers' signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers' signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
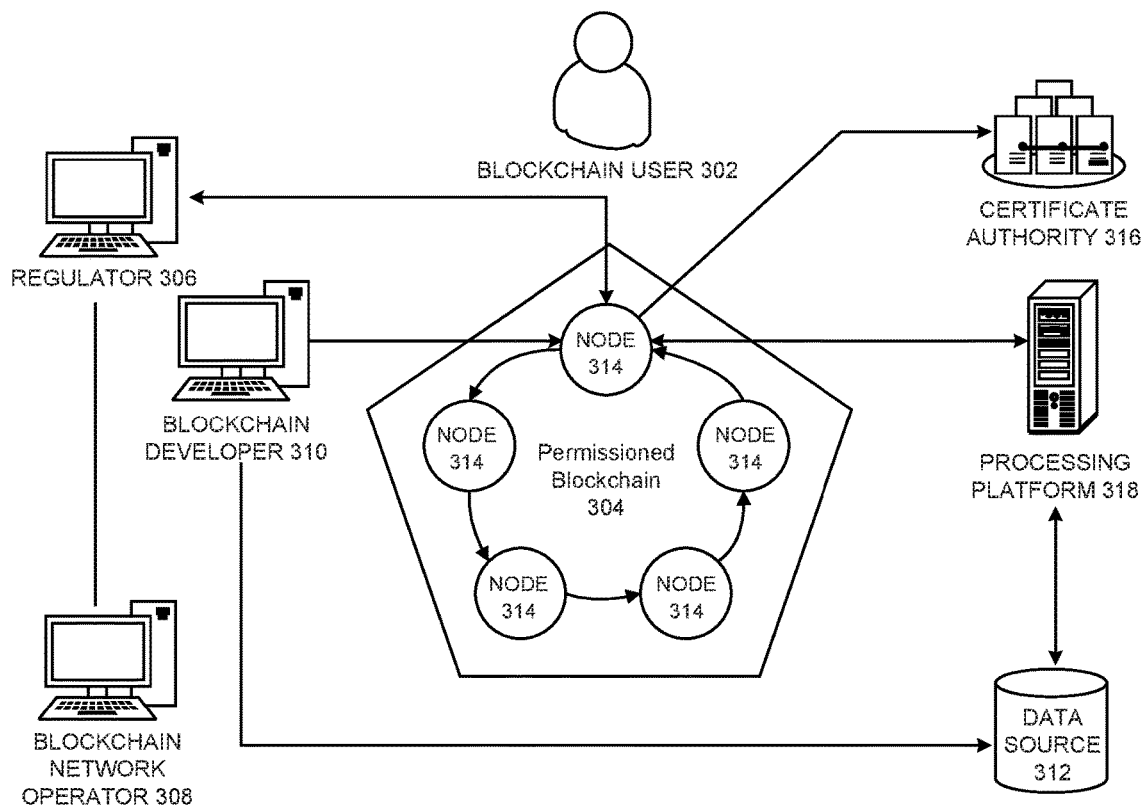
FIG. 3A illustrates a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
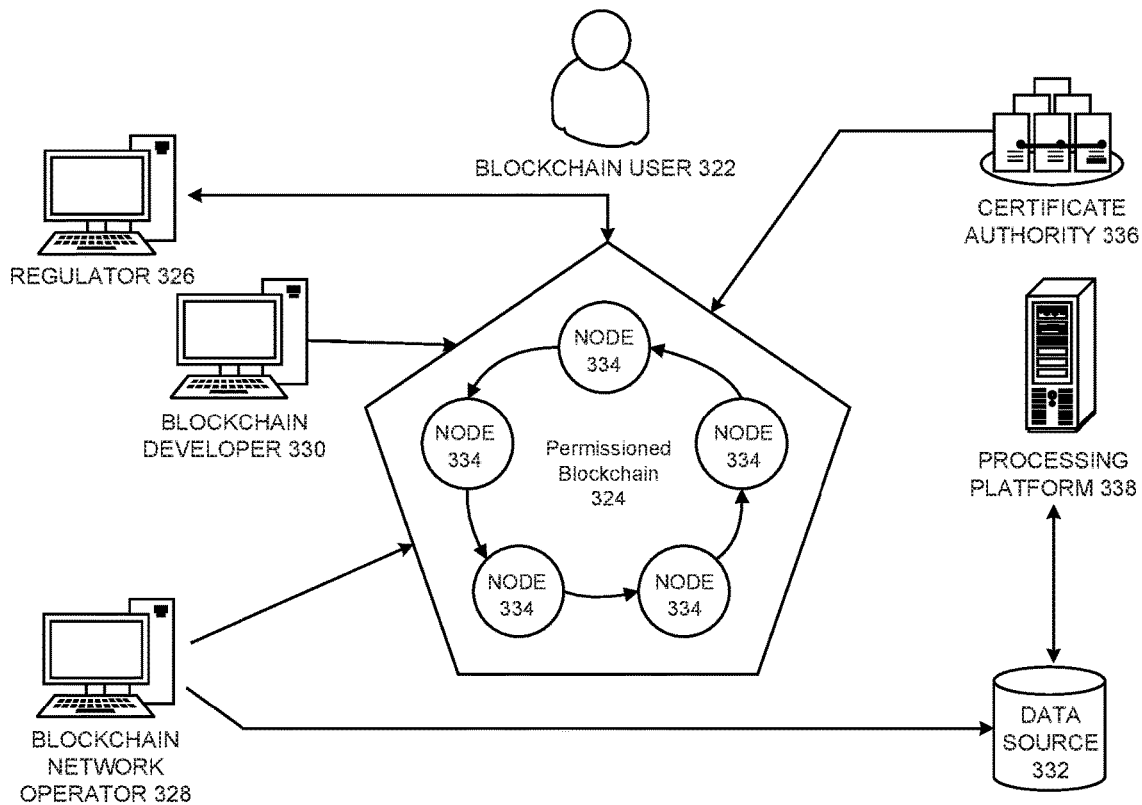
FIG. 3B illustrates another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

Figure 4A:
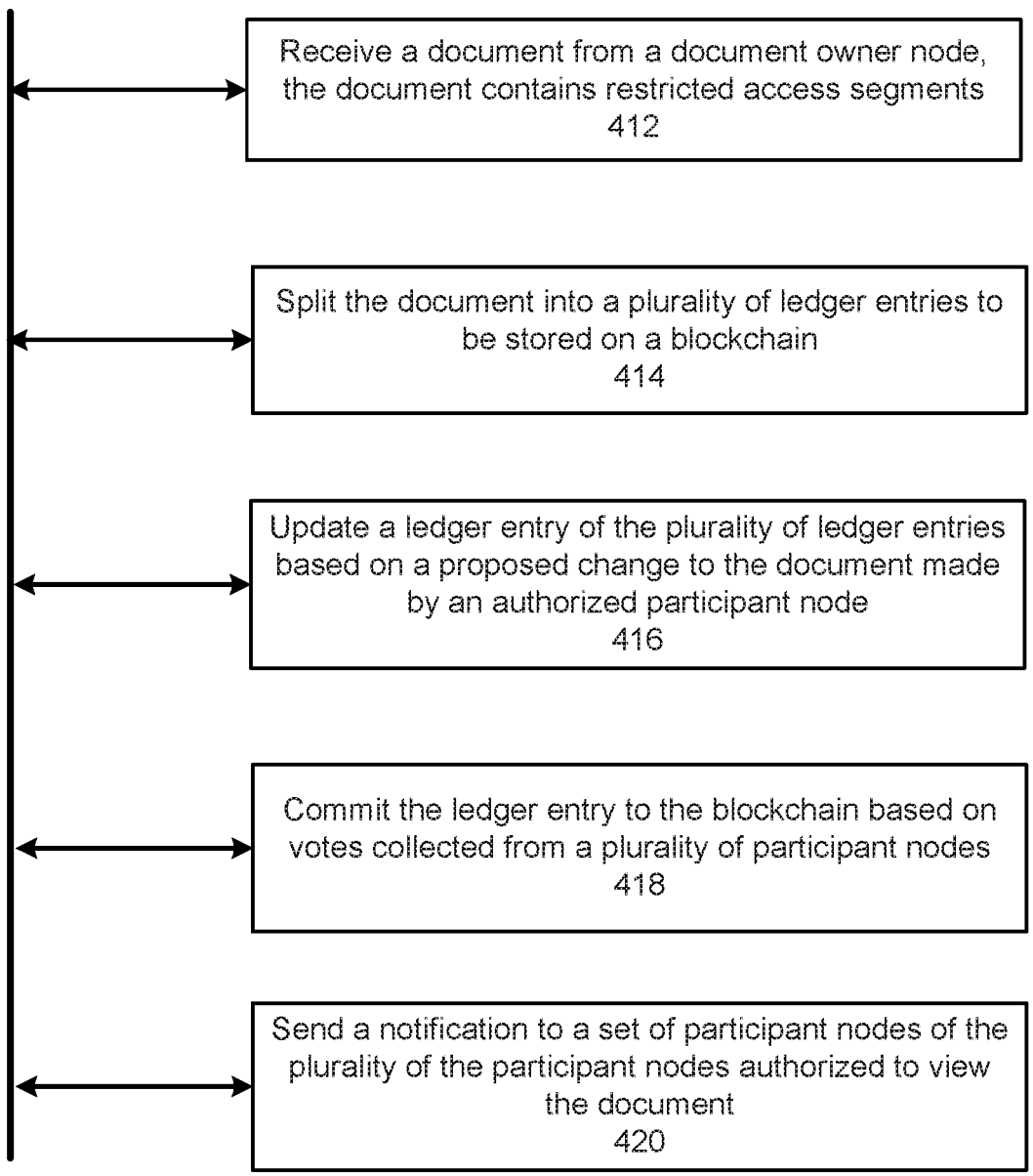
FIG. 4A illustrates a flow diagram, according to example embodiments.

FIG. 4A illustrates a flow diagram 400 of an example method for redaction and reconciliation of a document in blockchain networks, according to example embodiments. Referring to FIG. 4A, the method 400 may include one or more of the steps described below.

FIG. 4A illustrates a flow chart of an example method executed by the document server 102 (see FIG. 1). It should be understood that method 400 depicted in FIG. 4A may include additional operations and that some of the operations described therein may be removed and/or modified without departing from the scope of the method 400. The description of the method 400 is also made with reference to the features depicted in FIG. 1 for purposes of illustration. Particularly, the processor 104 of the document server 102 may execute some or all of the operations included in the method 400.

With reference to FIG. 4A, at block 412, the processor 104 may receive a document from a document owner node. The document may contain restricted access segments. At block 414, the processor 104 may split the document into a plurality of ledger entries to be stored on a blockchain. At block 416, the processor 104 may update a ledger entry of the plurality of ledger entries based on a proposed change to the document made by an authorized participant node. At block 418, the processor 104 may commit the ledger entry to the blockchain based on votes collected from a plurality of participant nodes. At block 420, the processor 104 may send a notification to a set of participant nodes of the plurality of the participant nodes authorized to view the document.

Figure 4B:
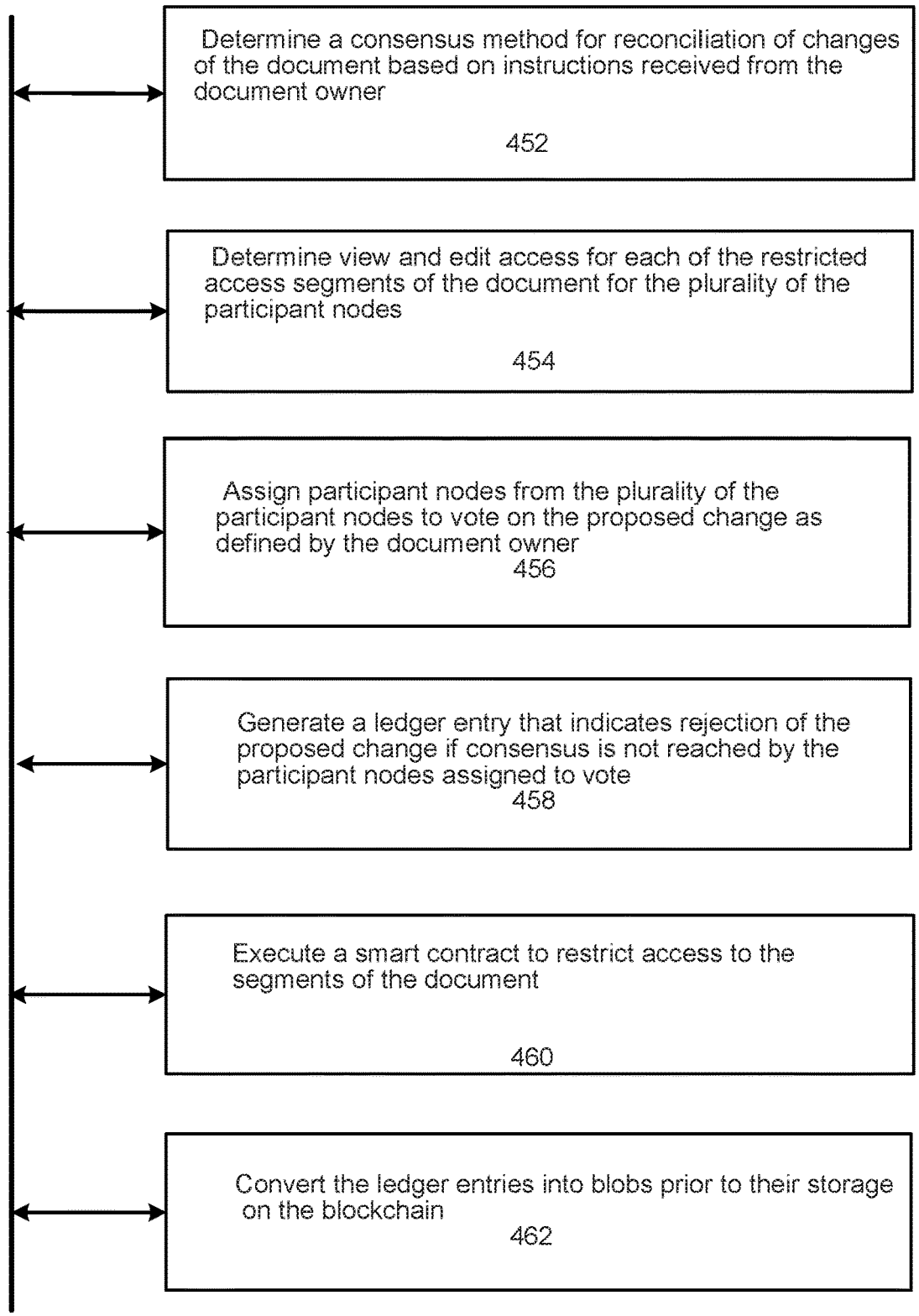
FIG. 4B illustrates a further flow diagram, according to example embodiments.

FIG. 4B illustrates a flow diagram 450 of an example method for redaction and reconciliation of a document in a blockchain network, according to example embodiments. Referring to FIG. 4B, the method 450 may also include one or more of the following steps. At block 452, the processor 104 may determine view and edit access for each of the restricted access segments of the document for the plurality of the participant nodes. At block 454, the processor 104 may determine a consensus method for reconciliation of changes of the document based on instructions received from the document owner. At block 456, the processor 104 may assign participant nodes from the plurality of the participant nodes to vote on the proposed change as defined by the document owner. At block 458, the processor 104 may generate a ledger entry that indicates rejection of the proposed change if consensus is not reached by the participant nodes assigned to vote. At block 460, the processor 104 may execute a smart contract to restrict access to the segments of the document. At block 462, the processor 104 may convert the ledger entries into blobs prior to their storage on the blockchain.

Figure 4C:
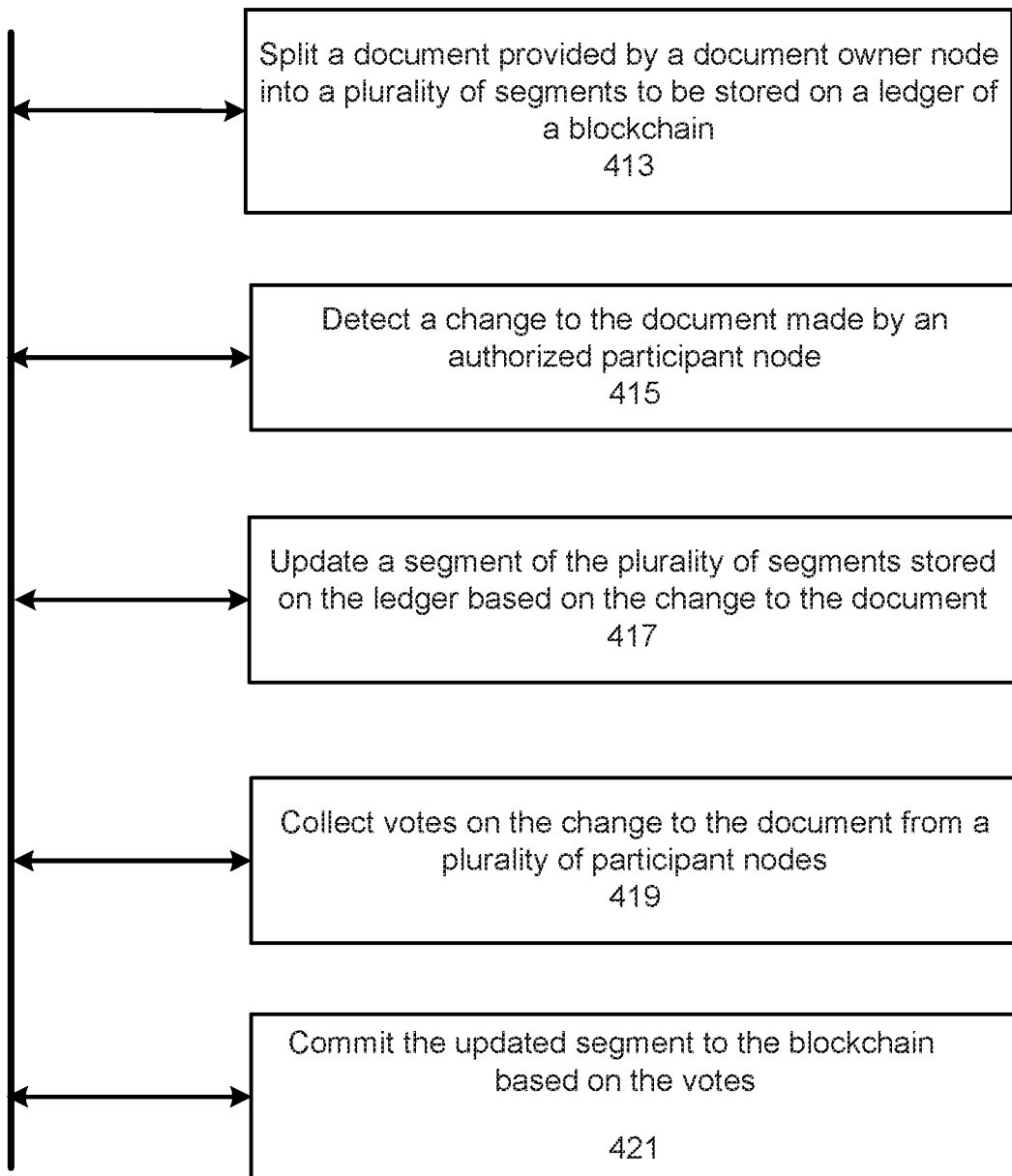
FIG. 4C illustrates a flow diagram, according to example embodiments.

FIG. 4C illustrates a flow diagram 410 of an example method for redaction and reconciliation of a document in blockchain networks, according to example embodiments.

Referring to FIG. 4C, the method 410 may include one or more of the steps described below.

FIG. 4C illustrates a flow chart of an example method executed by the document server 102 (see FIG. 1A). It should be understood that method 410 depicted in FIG. 4C may include additional operations and that some of the operations described therein may be removed and/or modified without departing from the scope of the method 410. The description of the method 410 is also made with reference to the features depicted in FIG. 1A for purposes of illustration. Particularly, the processor 104 of the document server 102 may execute some or all of the operations included in the method 410.

With reference to FIG. 4C, at block 413, the processor 104 may split a document provided by a document owner node into a plurality of segments to be stored on a ledger of a blockchain. At block 415, the processor 104 may detect a change to the document made by an authorized participant node. At block 417, the processor 104 may update a segment of the plurality of segments stored on the ledger based on the change to the document. At block 419, the processor 104 may collect votes on the change to the document from a plurality of participant nodes. At block 421, the processor 104 may commit the updated segment to the blockchain based on the votes.

Figure 4D:
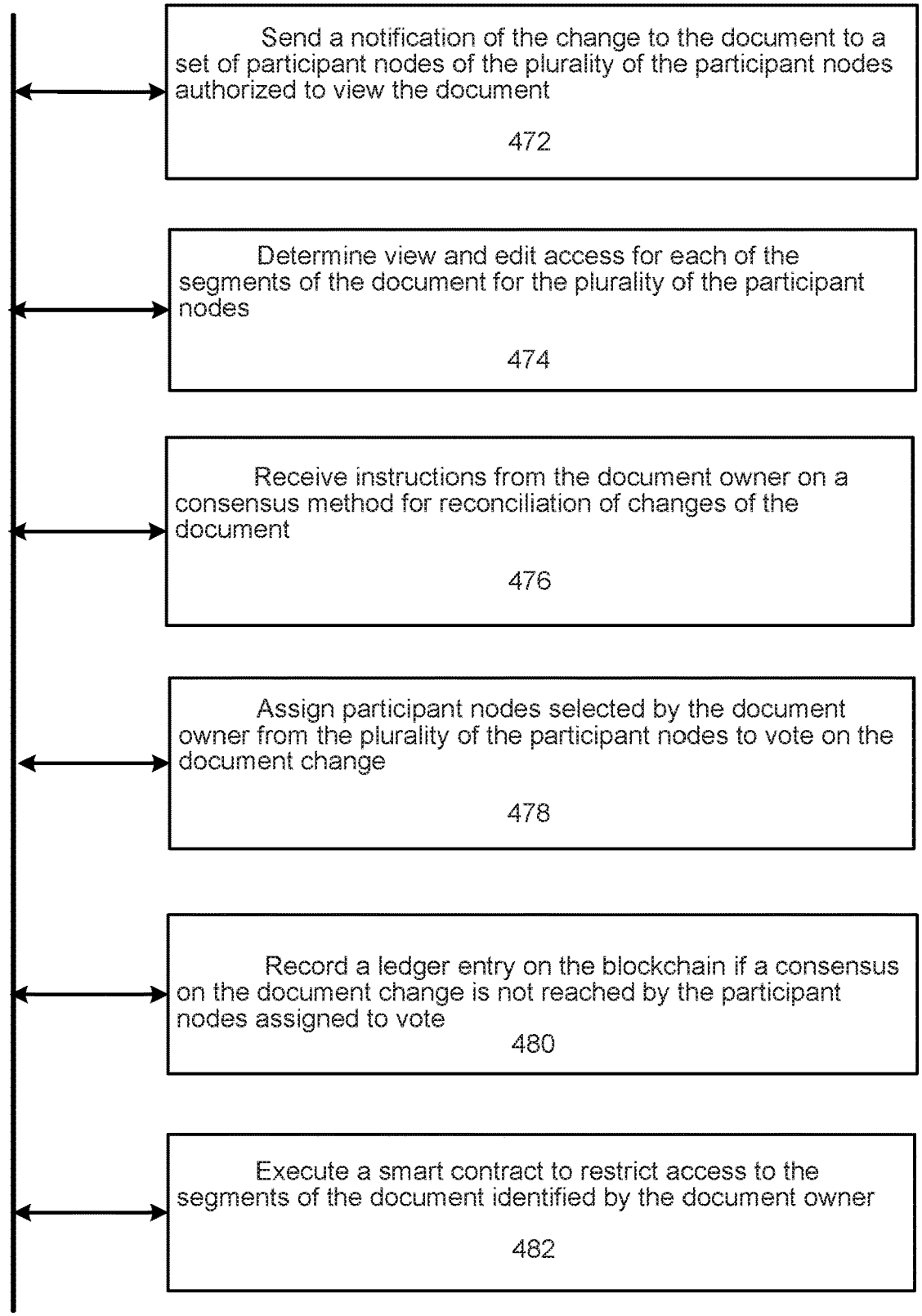
FIG. 4D illustrates a further flow diagram, according to example embodiments.

FIG. 4D illustrates a flow diagram 470 of an example method for redaction and reconciliation of a document in a blockchain network, according to example embodiments. Referring to FIG. 4D, the method 470 may also include one or more of the following steps. At block 472, the processor 104 may send a notification of the change to the document to a set of participant nodes of the plurality of the participant nodes authorized to view the document. At block 474, the processor 104 may determine view and edit access for each of the segments of the document for the plurality of the participant nodes. At block 476, the processor 104 may receive instructions from the document owner on a consensus method for reconciliation of changes of the document. At block 478, the processor 104 may assign participant nodes selected by the document owner from the plurality of the participant nodes to vote on the document change. At block 480, the processor 104 may record a ledger entry on the blockchain if a consensus on the document change is not reached by the participant nodes assigned to vote. At block 482, the processor 104 may execute a smart contract to restrict access to the segments of the document identified by the document owner.

Figure 5A:
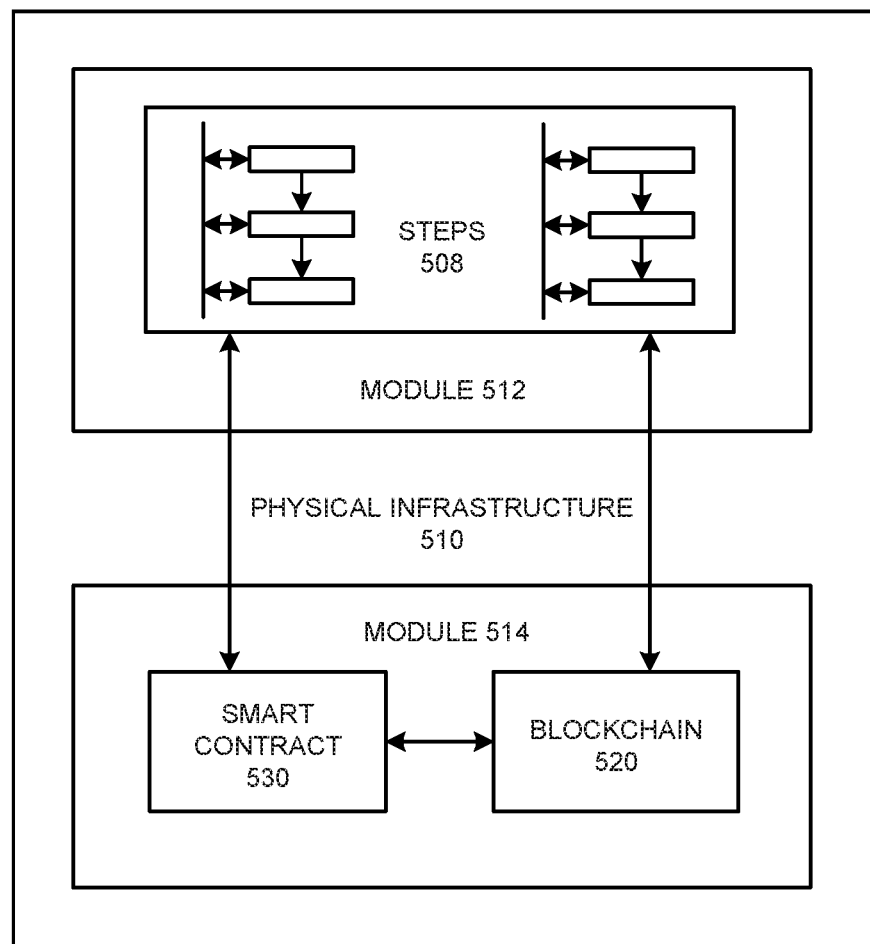
FIG. 5A illustrates an example system configured to perform one or more operations described herein, according to example embodiments.

FIG. 5A illustrates an example system 600 that includes a physical infrastructure 510 configured to perform various operations according to example embodiments. Referring to FIG. 5A, the physical infrastructure 510 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5B:
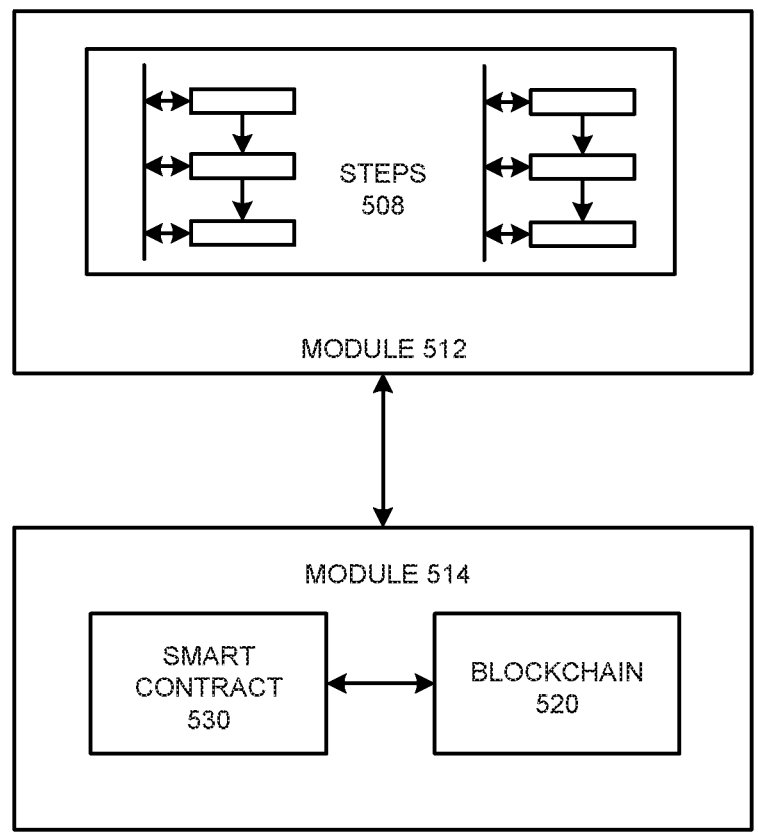
FIG. 5B illustrates another example system configured to perform one or more operations described herein, according to example embodiments.

FIG. 5B illustrates another example system 540 configured to perform various operations according to example embodiments. Referring to FIG. 6B, the system 640 includes a module 512 and a module 514. The module 514 includes a blockchain 520 and a smart contract 530 (which may reside on the blockchain 520), that may execute any of the operational steps 508 (in module 512) included in any of the example embodiments. The steps/operations 508 may include one or more of the embodiments described or depicted and may represent output or written information that is written or read from one or more smart contracts 530 and/or blockchains 520. The physical infrastructure 510, the module 512, and the module 514 may include one or more computers, servers, processors, memories, and/or wireless communication devices. Further, the module 512 and the module 514 may be a same module.

Figure 5C:
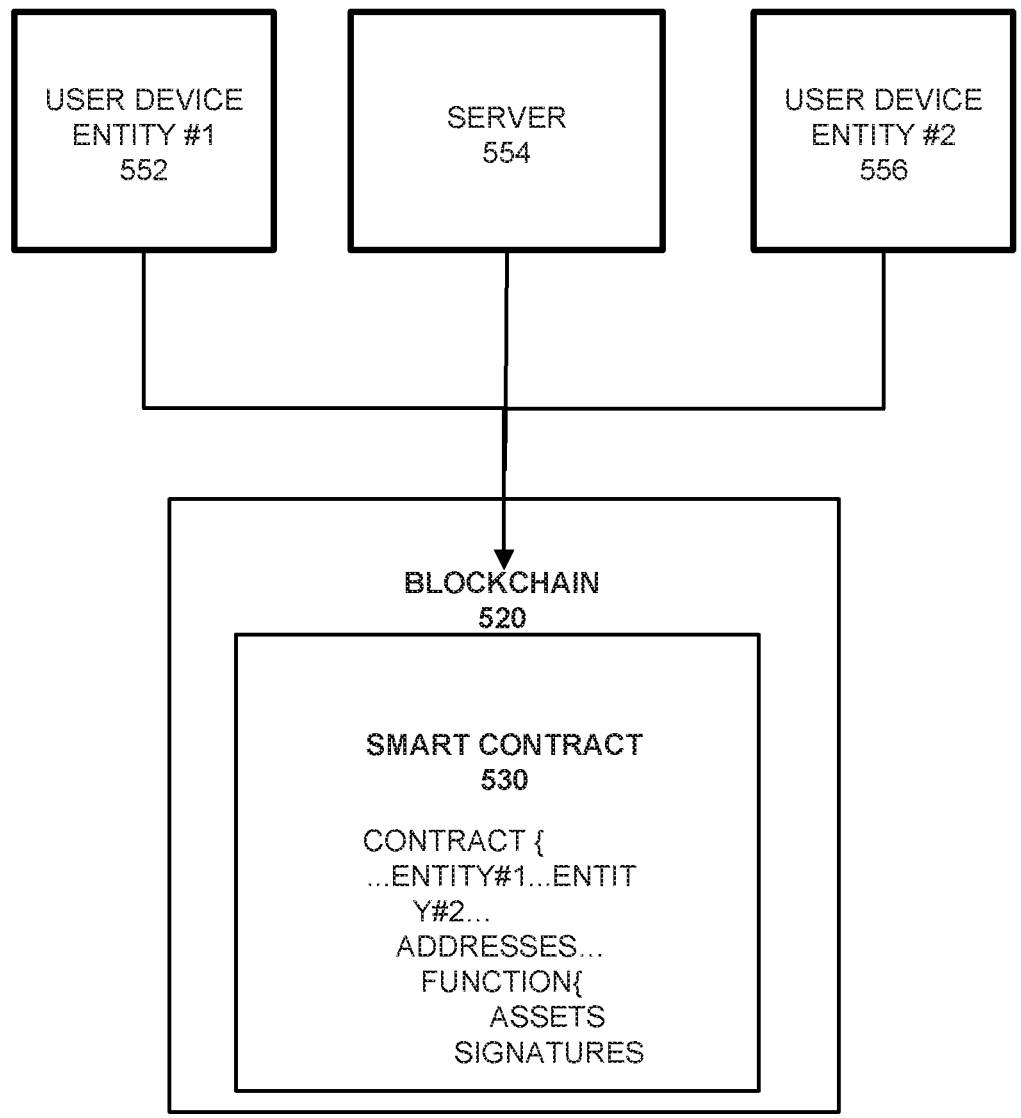
FIG. 5C illustrates a further example system configured to utilize a smart contract, according to example embodiments.

FIG. 5C illustrates an example system configured to utilize a smart contract configuration among contracting parties and a mediating server configured to enforce the smart contract terms on the blockchain according to example embodiments. Referring to FIG. 5C, the configuration 550 may represent a communication session, an asset transfer session or a process or procedure that is driven by a smart contract 530 which explicitly identifies one or more user devices 552 and/or 556. The execution, operations and results of the smart contract execution may be managed by a server 554. Content of the smart contract 530 may require digital signatures by one or more of the entities 552 and 556 which are parties to the smart contract transaction. The results of the smart contract execution may be written to a blockchain 520 as a blockchain transaction. The smart contract 530 resides on the blockchain 520 which may reside on one or more computers, servers, processors, memories, and/or wireless communication devices.

Figure 5D:
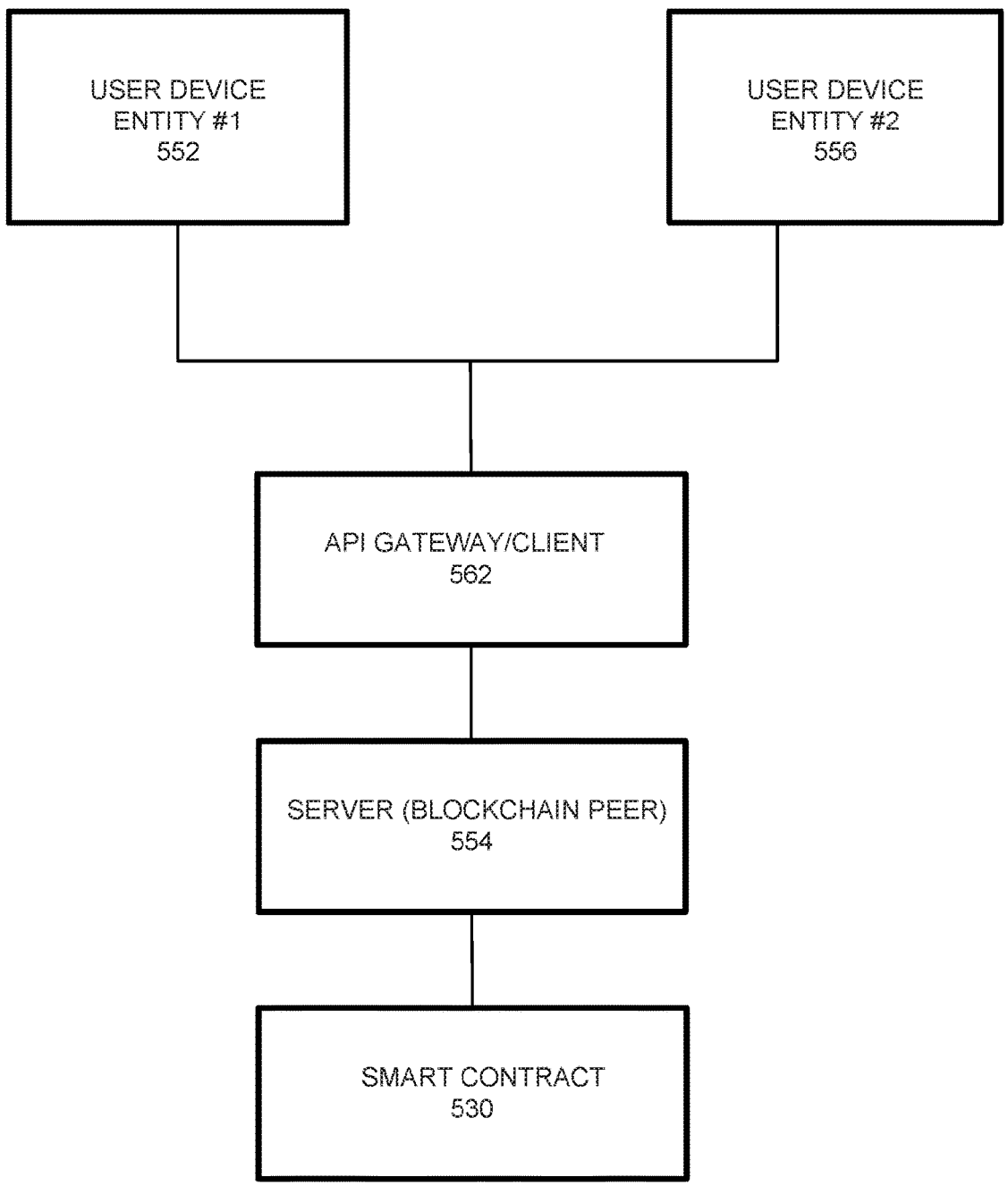
FIG. 5D illustrates yet another example system configured to utilize a blockchain, according to example embodiments.

FIG. 5D illustrates a system 560 including a blockchain, according to example embodiments. Referring to the example of FIG. 5D, an application programming interface (API) gateway 562 provides a common interface for accessing blockchain logic (e.g., smart contract 530 or other chaincode) and data (e.g., distributed ledger, etc.). In this example, the API gateway 562 is a common interface for performing transactions (invoke, queries, etc.) on the blockchain by connecting one or more entities 552 and 556 to a blockchain peer (i.e., server 554). Here, the server 554 is a blockchain network peer component that holds a copy of the world state and a distributed ledger allowing clients 552 and 556 to query data on the world state as well as submit transactions into the blockchain network where, depending on the smart contract 530 and endorsement policy, endorsing peers will run the smart contracts 530.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 6A:
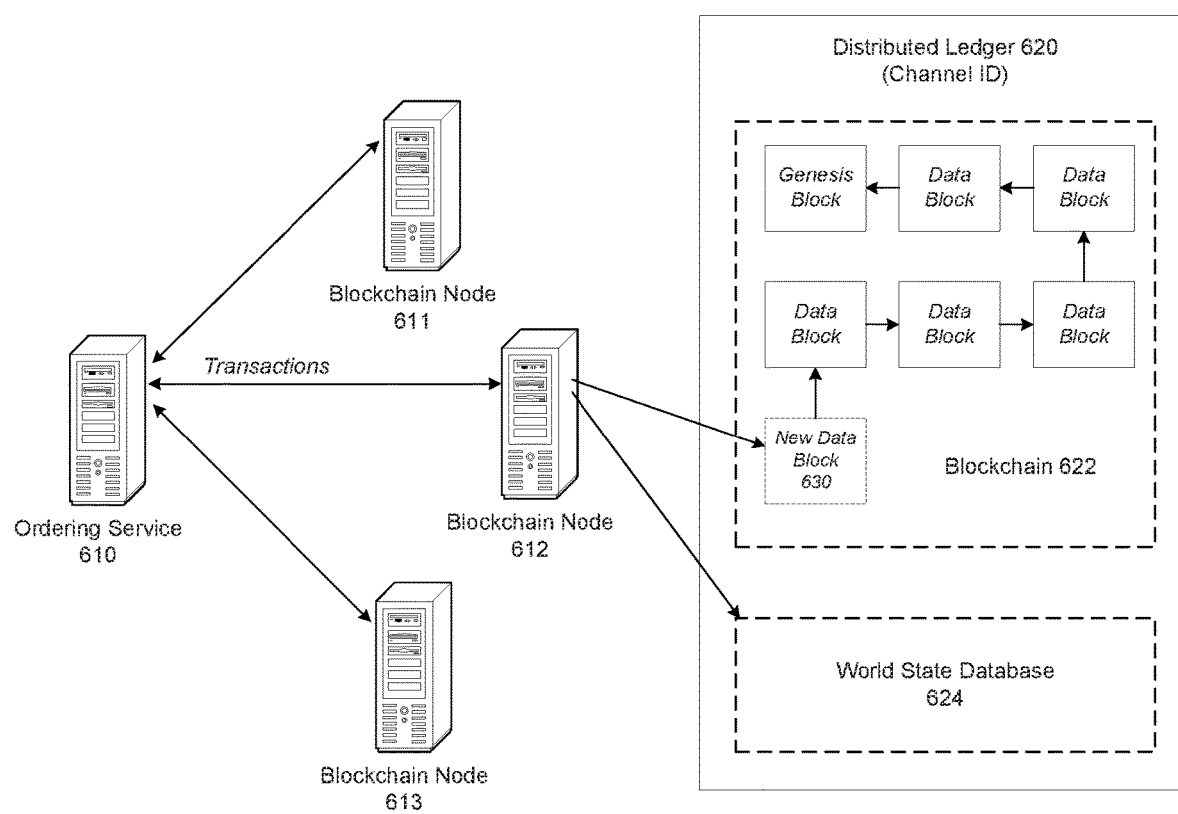
FIG. 6A illustrates a process for a new block being added to a distributed ledger, according to example embodiments.
Figure 6B:
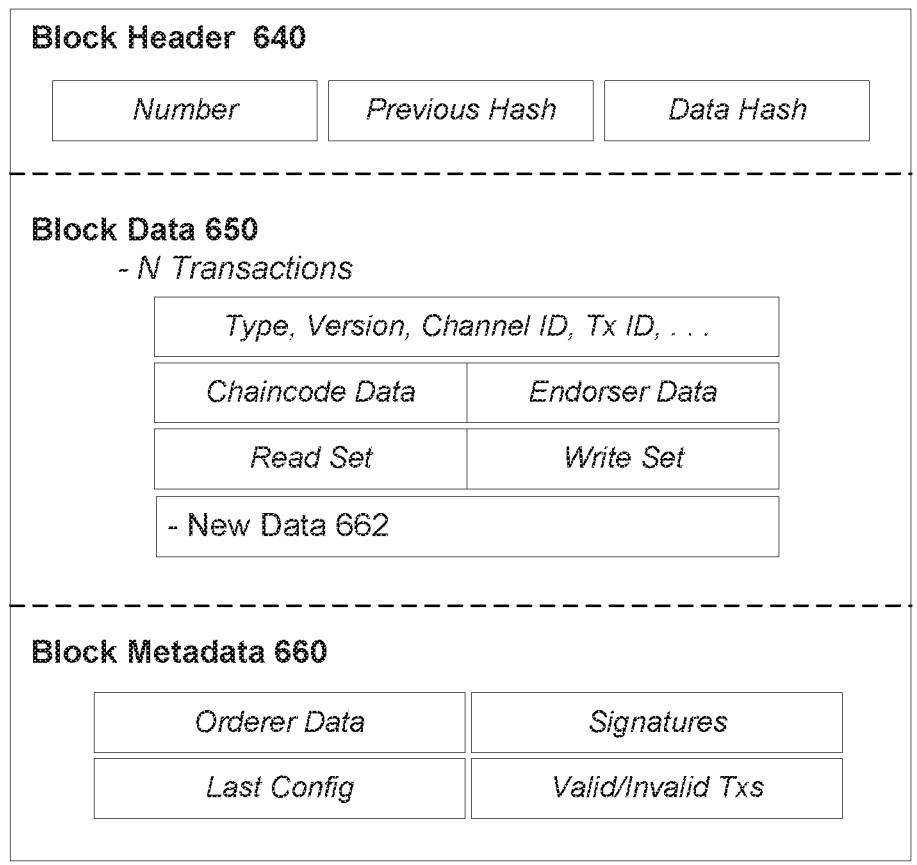
FIG. 6B illustrates contents of a new data block, according to example embodiments.

FIG. 6A illustrates a process 600 of a new block being added to a distributed ledger 620, according to example embodiments, and FIG. 6B illustrates contents of a new data block structure 630 for blockchain, according to example embodiments. Referring to FIG. 6A, clients (not shown) may submit transactions to blockchain nodes 611, 612, and/or 613. Clients may execute be instructions received from any source to enact activity on the blockchain 620. As an example, clients may be applications that act on behalf of a requester, such as a device, person or entity to propose transactions for the blockchain. The plurality of blockchain peers (e.g., blockchain nodes 611, 612, and 613) may maintain a state of the blockchain network and a copy of the distributed ledger 620. Different types of blockchain nodes/peers may be present in the blockchain network including endorsing peers which simulate and endorse transactions proposed by clients and committing peers which verify endorsements, validate transactions, and commit transactions to the distributed ledger 620. In this example, the blockchain nodes 611, 612, and 613 may perform the role of endorser node, committer node, or both.

The distributed ledger 620 includes a blockchain which stores immutable, sequenced records in blocks, and a state database 624 (current world state) maintaining a current state of the blockchain 622. One distributed ledger 620 may exist per channel and each peer maintains its own copy of the distributed ledger 620 for each channel of which they are a member. The blockchain 622 is a transaction log, structured as hash-linked blocks where each block contains a sequence of N transactions. Blocks may include various components such as shown in FIG. 6B. The linking of the blocks (shown by arrows in FIG. 6A) may be generated by adding a hash of a prior block's header within a block header of a current block. In this way, all transactions on the blockchain 622 are sequenced and cryptographically linked together preventing tampering with blockchain data without breaking the hash links. Furthermore, because of the links, the latest block in the blockchain 622 represents every transaction that has come before it. The blockchain 622 may be stored on a peer file system (local or attached storage), which supports an append-only blockchain workload.

The current state of the blockchain 622 and the distributed ledger 622 may be stored in the state database 624. Here, the current state data represents the latest values for all keys ever included in the chain transaction log of the blockchain 622. Chaincode invocations execute transactions against the current state in the state database 624. To make these chaincode interactions extremely efficient, the latest values of all keys are stored in the state database 624. The state database 624 may include an indexed view into the transaction log of the blockchain 622, it can therefore be regenerated from the chain at any time. The state database 624 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 610.

The ordering service 610 accepts endorsed transactions, orders them into a block, and delivers the blocks to the committing peers. For example, the ordering service 610 may initiate a new block when a threshold of transactions has been reached, a timer times out, or another condition. In the example of FIG. 6A, blockchain node 612 is a committing peer that has received a new data new data block 630 for storage on blockchain 620. The first block in the blockchain may be referred to as a genesis block which includes information about the blockchain, its members, the data stored therein, etc.

The ordering service 610 may be made up of a cluster of orderers. The ordering service 610 does not process transactions, smart contracts, or maintain the shared ledger. Rather, the ordering service 610 may accept the endorsed transactions and specifies the order in which those transactions are committed to the distributed ledger 620. The architecture of the blockchain network may be designed such that the specific implementation of 'ordering' (e.g., Solo, Kafka, BFT, etc.) becomes a pluggable component.

Transactions are written to the distributed ledger 620 in a consistent order. The order of transactions is established to ensure that the updates to the state database 624 are valid when they are committed to the network. Unlike a cryptocurrency blockchain system (e.g., Bitcoin, etc.) where ordering occurs through the solving of a cryptographic puzzle, or mining, in this example the parties of the distributed ledger 620 may choose the ordering mechanism that best suits that network.

When the ordering service 610 initializes a new data block 630, the new data block 630 may be broadcast to committing peers (e.g., blockchain nodes 611, 612, and 613). In response, each committing peer validates the transaction within the new data block 630 by checking to make sure that the read set and the write set still match the current world state in the state database 624. Specifically, the committing peer can determine whether the read data that existed when the endorsers simulated the transaction is identical to the current world state in the state database 624. When the committing peer validates the transaction, the transaction is written to the blockchain 622 on the distributed ledger 620, and the state database 624 is updated with the write data from the read-write set. If a transaction fails, that is, if the committing peer finds that the read-write set does not match the current world state in the state database 724, the transaction ordered into a block will still be included in that block, but it will be marked as invalid, and the state database 624 will not be updated.

Referring to FIG. 6B, a new data block 630 (also referred to as a data block) that is stored on the blockchain 622 of the distributed ledger 620 may include multiple data segments such as a block header 640, block data 650, and block metadata 660. It should be appreciated that the various depicted blocks and their contents, such as new data block 630 and its contents. shown in FIG. 6B are merely examples and are not meant to limit the scope of the example embodiments. The new data block 630 may store transactional information of N transaction(s) (e.g., 1, 10, 100, 500, 1000, 2000, 3000, etc.) within the block data 650. The new data block 630 may also include a link to a previous block (e.g., on the blockchain 622 in FIG. 6A) within the block header 640. In particular, the block header 640 may include a hash of a previous block's header. The block header 640 may also include a unique block number, a hash of the block data 650 of the new data block 630, and the like. The block number of the new data block 630 may be unique and assigned in various orders, such as an incremental/sequential order starting from zero.

The block data 650 may store transactional information of each transaction that is recorded within the new data block 630. For example, the transaction data may include one or more of a type of the transaction, a version, a timestamp, a channel ID of the distributed ledger 620, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 650 may also store new data 662 which adds additional information to the hash-linked chain of blocks in the blockchain 622. The additional information includes one or more of the steps, features, processes and/or actions described or depicted herein. Accordingly, the new data 662 can be stored in an immutable log of blocks on the distributed ledger 620. Some of the benefits of storing such new data 662 are reflected in the various embodiments disclosed and depicted herein. Although in FIG. 6B the new data 662 is depicted in the block data 650 but could also be located in the block header 640 or the block metadata 660.

The block metadata 660 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 610. Meanwhile, a committer of the block (such as blockchain node 612) may add validity/invalidity information based on an endorsement policy, verification of read/write sets, and the like. The transaction filter may include a byte array of a size equal to the number of transactions in the block data 650 and a validation code identifying whether a transaction was valid/invalid.

Figure 6C:
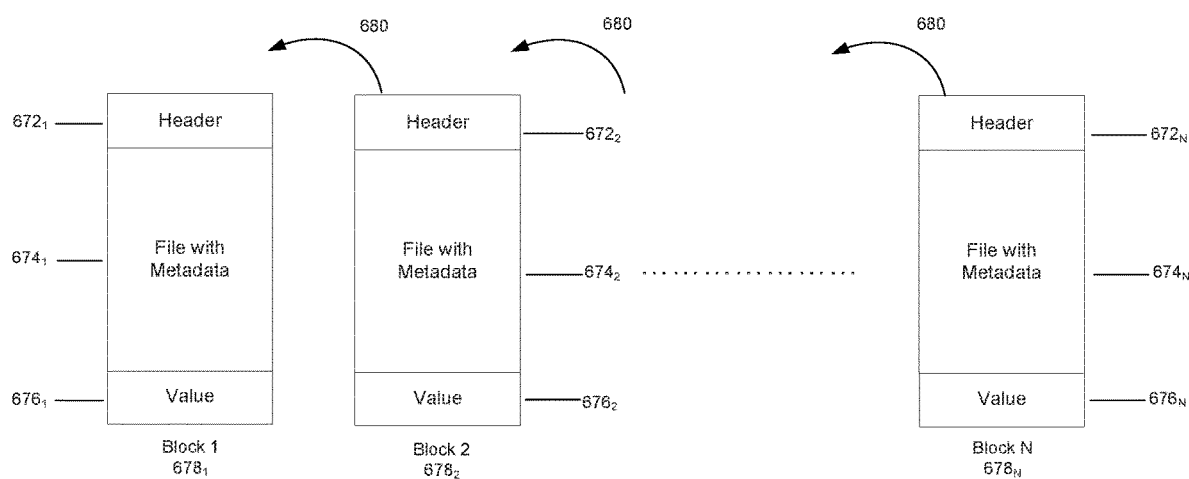
FIG. 6C illustrates a blockchain for digital content, according to example embodiments.

FIG. 6C illustrates an embodiment of a blockchain 670 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| Block N Hash Value | Block N Hash Value ... Content |

In the example embodiment of FIG. 6C, the blockchain 670 includes a number of blocks $678_1$, $678_2$, ... $678_N$ cryptographically linked in an ordered sequence, where N≥1. The encryption used to link the blocks $678_1$, $678_2$, ... $678_N$ may be any of a number of keyed or un-keyed Hash functions. In one embodiment, the blocks $678_1$, $678_2$, ... $678_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $678_1$, $678_2$, ... , $678_N$ may be cryptographically linked by a function that is different from a hash function. For purposes of illustration, the following description is made with reference to a hash function, e.g., SHA-2.

Each of the blocks $678_1$, $678_2$, ..., $678_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $678_1$ in the blockchain is referred to as the genesis block and includes the header $672_1$, original file $674_1$, and an initial value $676_1$. The hashing scheme used for the genesis block, and indeed in all subsequent blocks, may vary. For example, all the information in the first block $678_1$ may be hashed together and at one time, or each or a portion of the information in the first block $678_1$ may be separately hashed and then a hash of the separately hashed portions may be performed.

The header $672_1$ may include one or more initial parameters, which, for example, may include a version number, timestamp, nonce, root information, difficulty level, consensus protocol, duration, media format, source, descriptive keywords, and/or other information associated with original file $674_1$ and/or the blockchain. The header $672_1$ may be generated automatically (e.g., by blockchain network managing software) or manually by a blockchain participant. Unlike the header in other blocks $678_2$ to $678_N$ in the blockchain, the header $672_1$ in the genesis block does not reference a previous block, simply because there is no previous block.

The original file $674_1$ in the genesis block may be, for example, data as captured by a device with or without processing prior to its inclusion in the blockchain. The original file $674_1$ is received through the interface of the system from the device, media source, or node. The original file $674_1$ is associated with metadata, which, for example, may be generated by a user, the device, and/or the system processor, either manually or automatically. The metadata may be included in the first block $678_1$ in association with the original file $674_1$.

The value $676_1$ in the genesis block is an initial value generated based on one or more unique attributes of the original file $674_1$. In one embodiment, the one or more unique attributes may include the hash value for the original file $674_1$, metadata for the original file $674_1$, and other information associated with the file. In one implementation, the initial value $676_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $678_2$ to $678_N$ in the blockchain also have headers, files, and values. However, unlike the first block $672_1$, each of the headers $672_2$ to $672_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 680, to establish an auditable and immutable chain-of-custody.

Each of the header $672_2$ to $672_N$ in the other blocks may also include other information, e.g., version number, timestamp, nonce, root information, difficulty level, consensus protocol, and/or other parameters or information associated with the corresponding files and/or the blockchain in general.

The files $674_2$ to $674_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $676_2$ to $676_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixilated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 6D:
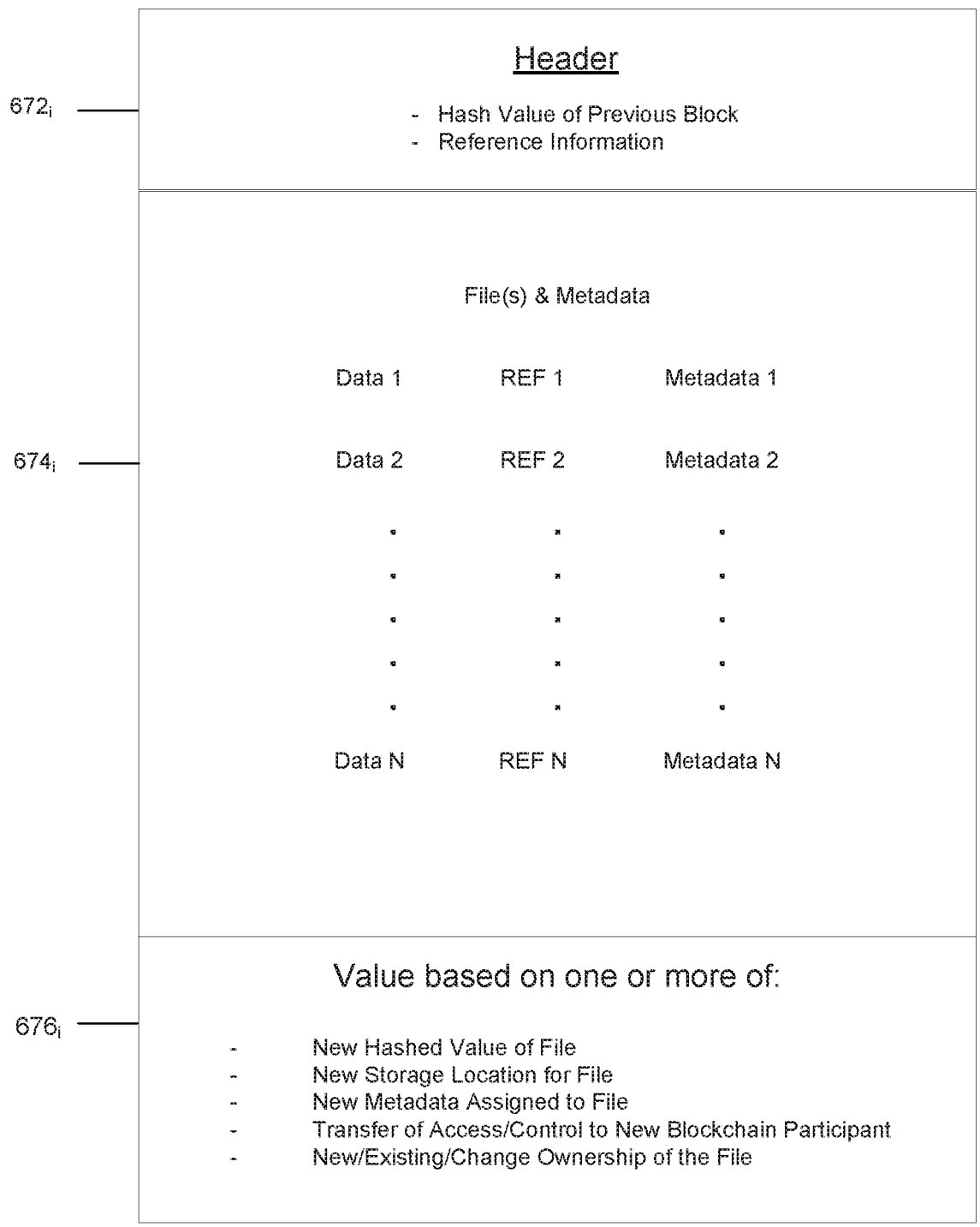
FIG. 6D illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 6D illustrates an embodiment of a block which may represent the structure of the blocks in the blockchain 690 in accordance with one embodiment. The block, $Block_i$, includes a header $672_i$, a file $674_i$, and a value $676_i$.

The header $672_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $674_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_3$, $REF_2$, $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $676_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 670 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 7:
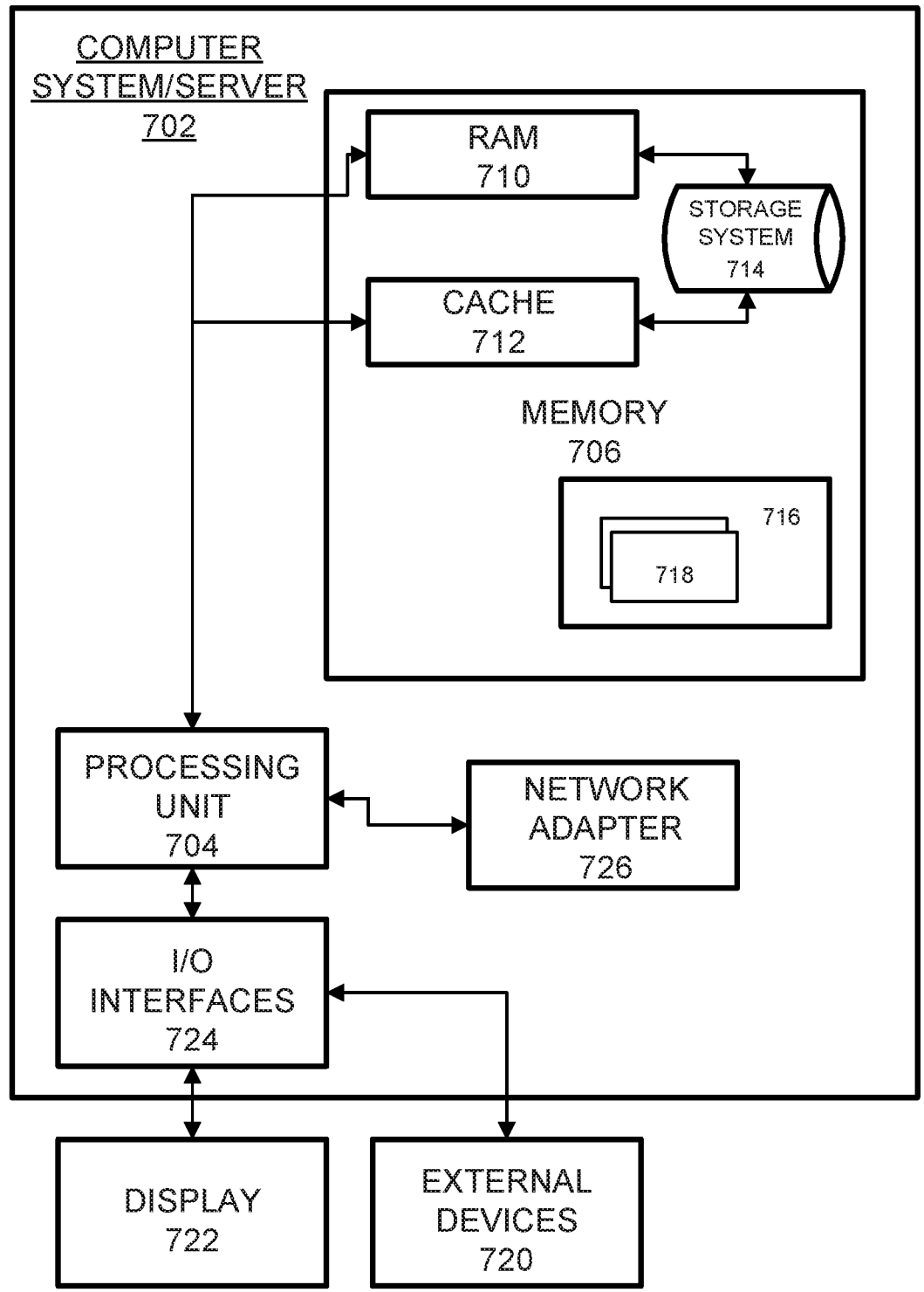
FIG. 7 illustrates an example system that supports one or more of the example embodiments.

FIG. 7 illustrates an example system 700 that supports one or more of the example embodiments described and/or depicted herein. The system 700 comprises a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system comprising:
a memory storing one or more instructions; and
a processor that when executing the one or more instructions is configured to:
split a document provided by a document owner node into a plurality of segments and store the plurality of segments via a blockchain ledger of a blockchain network, wherein a plurality of participant nodes of the blockchain network are assigned different restrictions with respect to the plurality of segments,
receive a proposed change to the document which is input via a view of the document at a participant node among the plurality of participant nodes,
approve the proposed change to the document based on votes on the proposed change collected from the plurality of authorized participant nodes, and
in response to the determination, update a view of the document at a different participant node from among the plurality of participants nodes by redacting a portion of the document based on a smart contract of the blockchain ledger of the blockchain network and the approved proposed change to the document.

2. The system of claim 1, wherein the processor is further configured to:
send a notification of the update to the document to the plurality of authorized participant nodes.

3. The system of claim 1, wherein the processor is further configured to:
determine, for the plurality of the participant nodes, view access and edit access for the segment.

4. The system of claim 1, wherein the processor is further configured to:
receive a consensus method for reconciliation of the proposed change from the document owner node.

5. The system of claim 1, wherein the processor is further configured to:
assign the plurality of authorized participant nodes to vote on the proposed change to the document.

6. The system of claim 1, wherein the processor is further configured to:
convert a segment into a blob prior to storage on the blockchain ledger.

7. A method, comprising:
splitting, by a document server of a blockchain network, a document provided by a document owner node into a plurality of segments and storing the plurality of segments via a blockchain ledger of the blockchain network, wherein a plurality of participant nodes of the blockchain network are assigned different restrictions with respect to the plurality of segments;
receiving a proposed change to the document which is input via a view of the document at a participant node among the plurality of participant nodes;
approving the proposed change to the document based on votes on the proposed change collected from the plurality of authorized participant nodes, and
in response to the determination, updating a view of the document at a different participant node from among the plurality of participants nodes by redacting a portion of the document based on a smart contract of the blockchain ledger of the blockchain network and the approved proposed change to the document.

8. The method of claim 7, further comprising:
sending a notification of the update to the document to the plurality of authorized participant nodes.

9. The method of claim 7, further comprising:
determining, for the plurality of the participant nodes, view access and edit access for the segment.

10. The method of claim 7, further comprising:
receiving a consensus method for reconciliation of the proposed change from the document owner node.

11. The method of claim 7, further comprising:
assigning the plurality of authorized participant nodes to vote on the proposed change to the document.

12. The method of claim 7, further comprising:
converting a segment into a blob prior to storage on the blockchain ledger.

13. A non-transitory computer readable medium comprising one or more instructions that when executed by a processor of a server in a blockchain network cause the processor to perform:
splitting a document provided by a document owner node into a plurality of segments and storing the plurality of segments via a blockchain ledger of the blockchain network, wherein a plurality of participant nodes of the blockchain network are assigned different restrictions with respect to the plurality of segments;
receiving a proposed change to the document which is input via a view of the document at a participant node among the plurality of participant nodes which is authorized to update the segment within the different access restrictions;
approving the proposed change based on votes on the proposed change collected from the plurality of authorized participant nodes, and
in response to the determination, updating a view of the document at a different participant node from among the plurality of participants nodes by redacting a portion of the document based on a smart contract of the blockchain ledger of the blockchain network and the approved proposed change to the document.

14. The non-transitory computer readable medium of claim 13, wherein the one or more instructions further cause the processor to perform:
sending a notification of the update to the document to the plurality of authorized participant nodes.

15. The non-transitory computer readable medium of claim 13, wherein the one or more instructions further cause the processor to perform:
determining, for the plurality of the participant nodes, view access and edit access for the segment.

16. The non-transitory computer readable medium of claim 13, wherein the one or more instructions further cause the processor to perform:
receiving a consensus method for reconciliation of the proposed change from the document owner node.

17. The non-transitory computer readable medium of claim 13, wherein the one or more instructions further cause the processor to perform:
assigning the plurality of authorized participant nodes to vote on the proposed change to the document.

* * * * *